United States Patent
McNamara et al.

(10) Patent No.: US 10,053,130 B1
(45) Date of Patent: Aug. 21, 2018

(54) STROLLER HAVING LOCKING MECHANISM

(71) Applicant: Helen of Troy Limited, Belleville, St. Michael (BB)

(72) Inventors: Conor P. McNamara, Montclair, NJ (US); Thomas C. Hanson, New York, NY (US)

(73) Assignee: Helen of Troy Limited, St. Michael (BB)

( * ) Notice: Subject to any disclaimer, the term of this patent is extended or adjusted under 35 U.S.C. 154(b) by 0 days.

(21) Appl. No.: 15/588,864

(22) Filed: May 8, 2017

(51) Int. Cl.
B62B 7/06 (2006.01)
B62B 7/08 (2006.01)
B62B 9/20 (2006.01)

(52) U.S. Cl.
CPC ............... B62B 7/086 (2013.01); *B62B 9/20* (2013.01); *B62B 2205/04* (2013.01); *B62B 2205/06* (2013.01); *B62B 2205/20* (2013.01)

(58) Field of Classification Search
CPC ......... B62B 2205/02; B62B 7/06; B62B 7/08; B62B 7/086; B62V 7/06; B62V 7/08; B62V 7/086
See application file for complete search history.

(56) References Cited

U.S. PATENT DOCUMENTS

| | | |
|---|---|---|
| 5,288,098 A | 2/1994 | Shamie |
| 5,524,503 A | 6/1996 | Ishikura |
| 5,535,483 A | 7/1996 | Cabagnero |
| 5,863,061 A | 1/1999 | Ziegler |
| 6,322,098 B1 | 11/2001 | Lan |
| 6,485,216 B1 | 11/2002 | Cheng |
| 6,565,111 B2 | 5/2003 | Ageneau |
| 6,820,891 B2 | 11/2004 | Suga |
| 7,108,275 B2 | 9/2006 | Yeh et al. |
| 8,408,580 B2 * | 4/2013 | Liao ................ B62B 7/086 280/642 |
| 8,534,698 B2 | 9/2013 | Dotsey |
| 8,651,502 B2 | 2/2014 | Winterhalter et al. |
| 8,870,215 B2 | 10/2014 | Li |
| 2008/0093825 A1 | 4/2008 | Yang |
| 2012/0235385 A1 | 9/2012 | Simpson |

FOREIGN PATENT DOCUMENTS

| | | |
|---|---|---|
| EP | 1916173 | 4/2008 |
| WO | 2016034994 | 3/2016 |

* cited by examiner

*Primary Examiner* — Bryan A Evans
(74) *Attorney, Agent, or Firm* — Rankin, Hill & Clark LLP

(57) ABSTRACT

A collapsible stroller includes a stroller frame, a folding lock mechanism, a lateral lock mechanism, and a trigger mechanism. The stroller frame includes a right upper side frame member pivotally connected with a right lower side frame member and a left upper side frame member pivotally connected with a left lower side frame member. The folding lock mechanism is capable of a locked state and an unlocked state. The lateral lock mechanism is capable of a locked operating state and an unlocked operating state. The trigger mechanism is on the stroller frame, and actuation of the trigger mechanism moves the folding lock mechanism from the locked state to the unlocked state and moves the lateral lock mechanism from the locked operating state to the unlocked operating state.

12 Claims, 5 Drawing Sheets

STROLLER HAVING LOCKING MECHANISM

BACKGROUND

Conventional strollers collapse to reduce the overall size of the stroller when carried around or when in storage. Conventional strollers can collapse by pivoting handles toward front wheels of the stroller to move from a deployed position to a collapsed position. Umbrella folding strollers can also bring together lateral side frame members to reduce the overall width of the stroller when in the collapsed position.

SUMMARY

A collapsible stroller includes a stroller frame, a folding lock mechanism, a lateral lock mechanism, and a trigger mechanism. The stroller frame is movable between a deployed position and a collapsed position. The stroller frame includes a right upper side frame member pivotally connected with a right lower side frame member and a left upper side frame member pivotally connected with a left lower side frame member. The folding lock mechanism is capable of a locked state and an unlocked state. In the locked state, the folding lock mechanism precludes the upper side frame members from pivoting toward the lower side frame members, and in the unlocked state allows the upper side frame members to pivot towards the lower side frame members. The lateral lock mechanism is capable of a locked operating state and an unlocked operating state. In the locked operating state, the lateral locked mechanism precludes lateral movement of the right side frame members toward the left side frame members, and in the unlocked operating state, the lateral lock mechanism allows lateral movement of the right side frame members toward the left side frame members. The trigger mechanism is on the stroller frame, and actuation of the trigger mechanism moves the folding lock mechanism from the locked state to the unlocked state and moves the lateral lock mechanism from the locked operating state to the unlocked operating state.

A method for moving a stroller between a deployed position and a collapsed position includes, with the stroller in the deployed position, moving a trigger provided on a stroller frame from a first location to a second location, which changes a folding lock mechanism from a locked state to an unlocked state and changes a lateral lock mechanism from a locked operating state to an unlocked operating state. With the folding lock mechanism in the unlocked state, the method further includes pivoting an upper side frame member toward a lower side frame member. With the lateral lock mechanism in the unlocked operating state, the method further includes moving a right side frame member toward a left side frame member.

DETAILED DESCRIPTION

Figure 1:
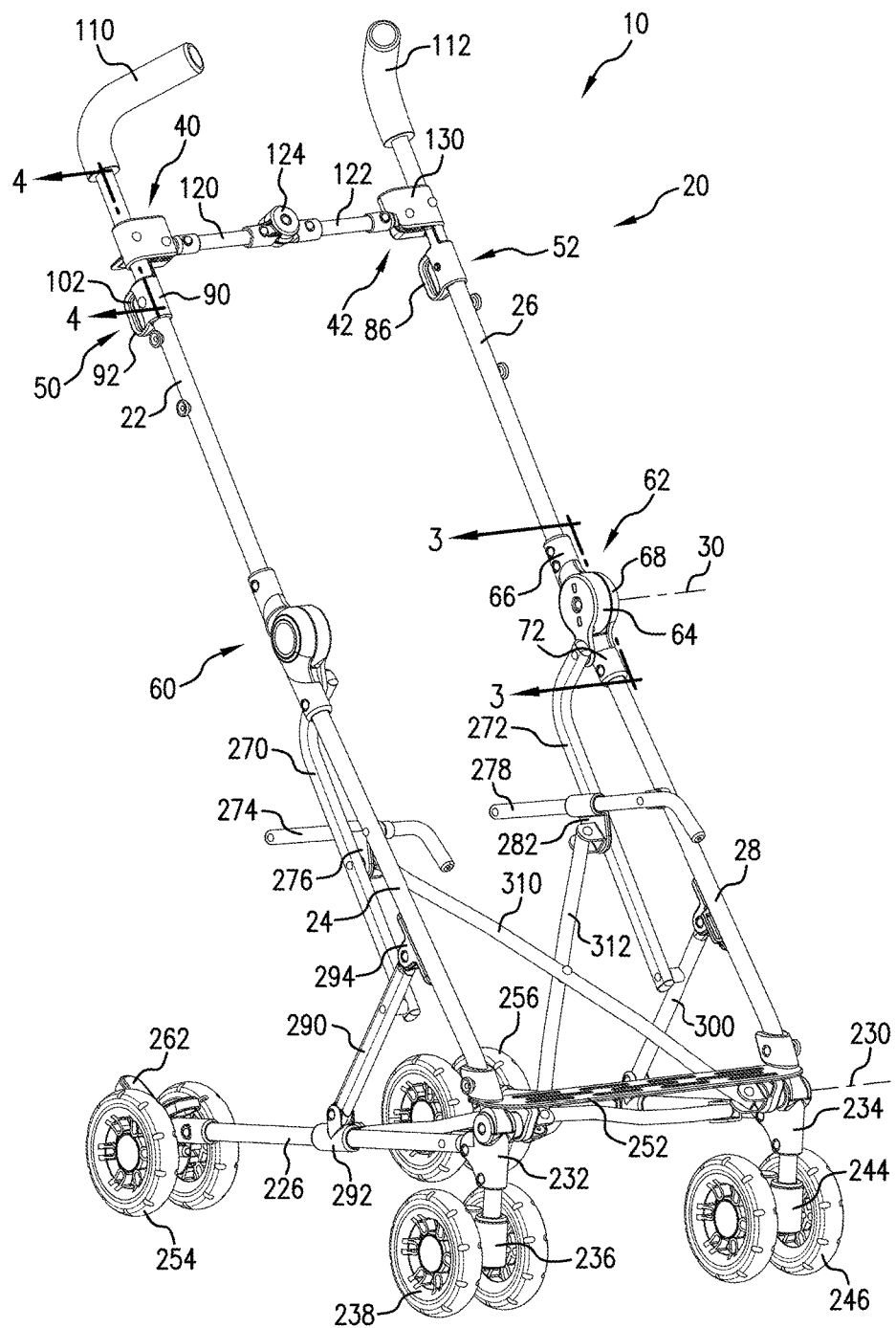
FIG. 1 is a front perspective view of a stroller frame in a deployed position.
Figure 2:
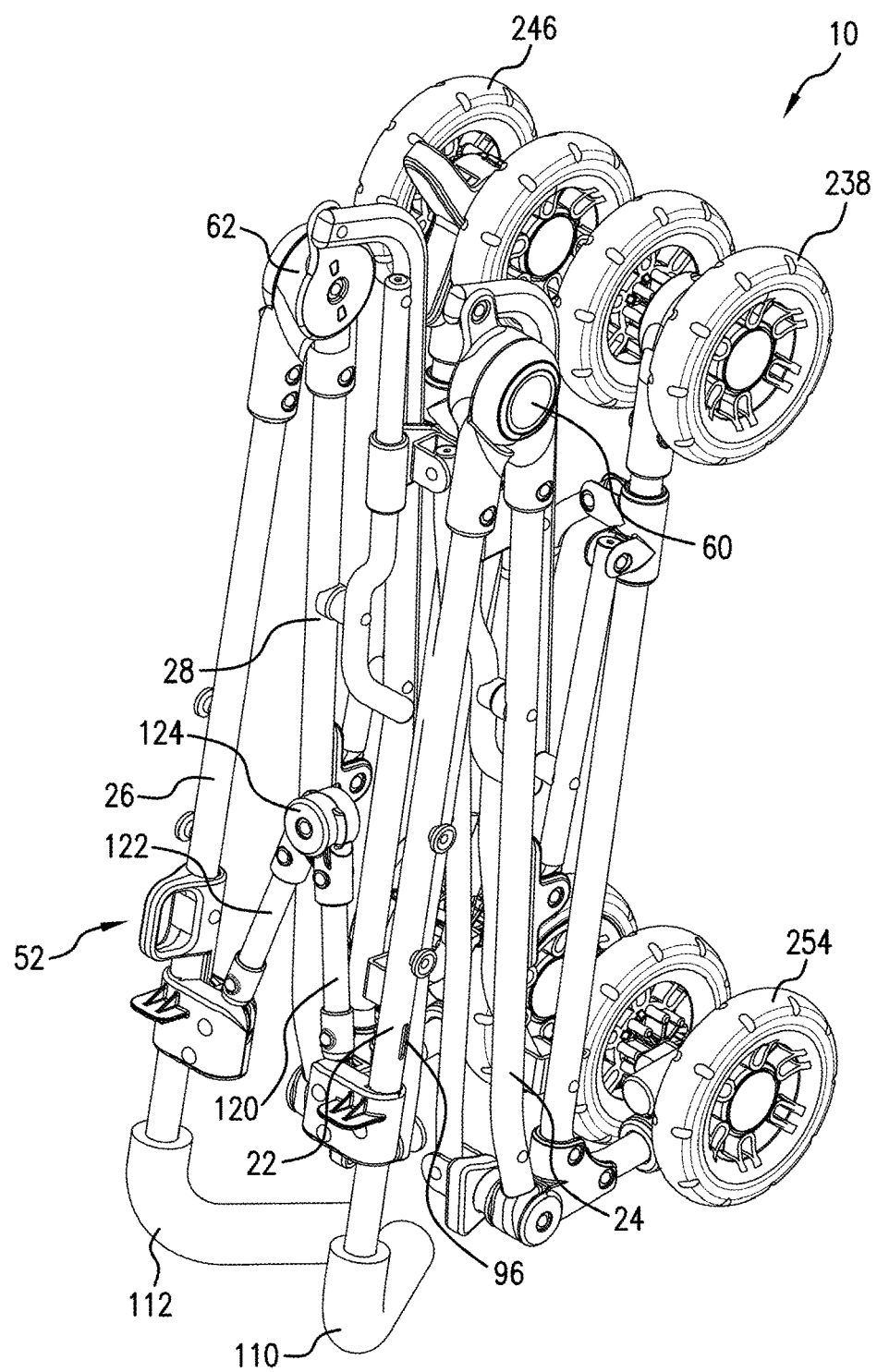
FIG. 2 is a rear perspective view of the stroller frame in a collapsed position.

With reference to FIG. 1, a stroller 10 includes soft goods (not shown in FIG. 1) that can include a seat, a canopy, and a basket, all of which are known. The stroller 10 further includes a stroller frame 20 that supports these soft goods. The soft goods can vary considerably in configuration and are not shown in detail to provide more clarity to the drawings. The stroller frame 20 (as well as the stroller 10) is movable between a deployed position, which is shown in FIG. 1, and a collapsed position, which is shown in FIG. 2.

The stroller frame 20 includes a right upper side frame member 22 pivotally connected with a right lower side frame member 24, and a left upper side frame member 26 pivotally connected with a left lower side frame member 28. The upper side frame members 22, 26 can pivot with respect to the lower side frame members 24, 28 about a first pivot axis 30.

Figure 3:
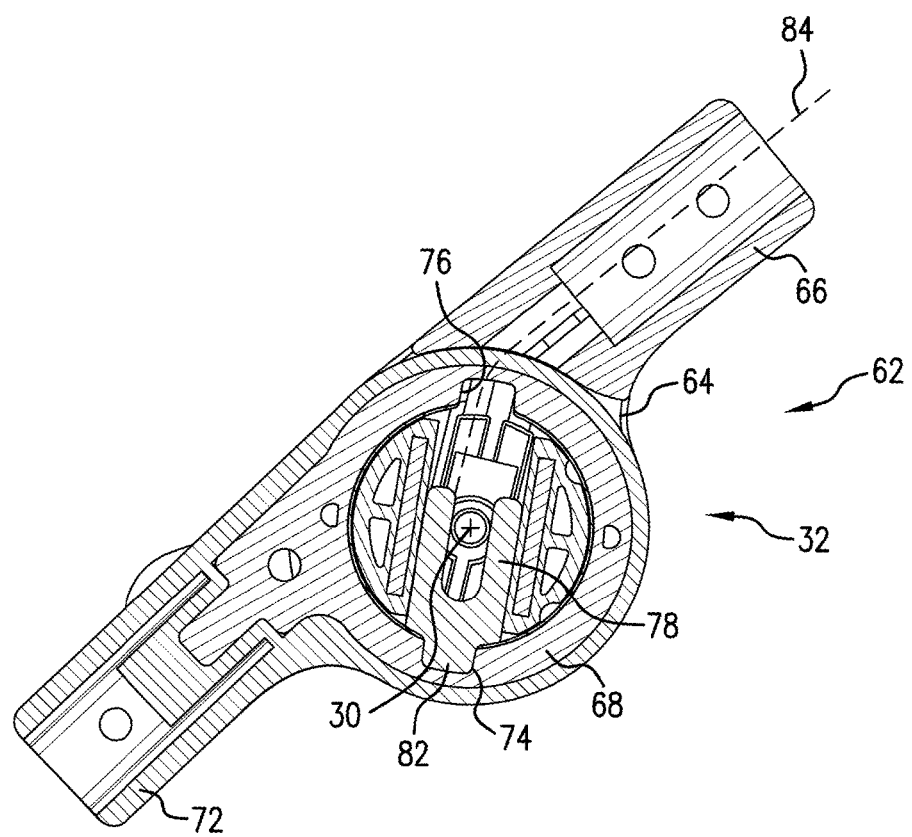
FIG. 3 is a cross-sectional view taken along line 3-3 in FIG. 1.

With reference to FIG. 3, the stroller 10 also includes a folding lock mechanism 32 capable of a locked state (shown in FIG. 3) and an unlocked state. The folding lock mechanism 32 depicted in FIG. 3 is a left folding lock mechanism that precludes the left upper side frame member 26 from pivoting with respect to the left lower side frame member 28 when in the locked state. In the unlocked state, the left folding lock mechanism 32 allows the left upper side frame member 26 to pivot with respect to the left lower side frame member 28. A similar right folding lock mechanism (not shown in detail) is provided on the right side of the stroller frame 20 and precludes the right upper side frame member 22 from pivoting with respect to the right lower side frame member 24 when in the locked state, and allows the right upper side frame member 22 to pivot with respect to the right lower side frame member 24 when in the unlocked state. When the folding lock mechanisms are in the unlocked state, the upper side frame members 22, 26 can pivot with respect to the lower side frame members 24, 28 about the first pivot axis 30.

Figure 4:
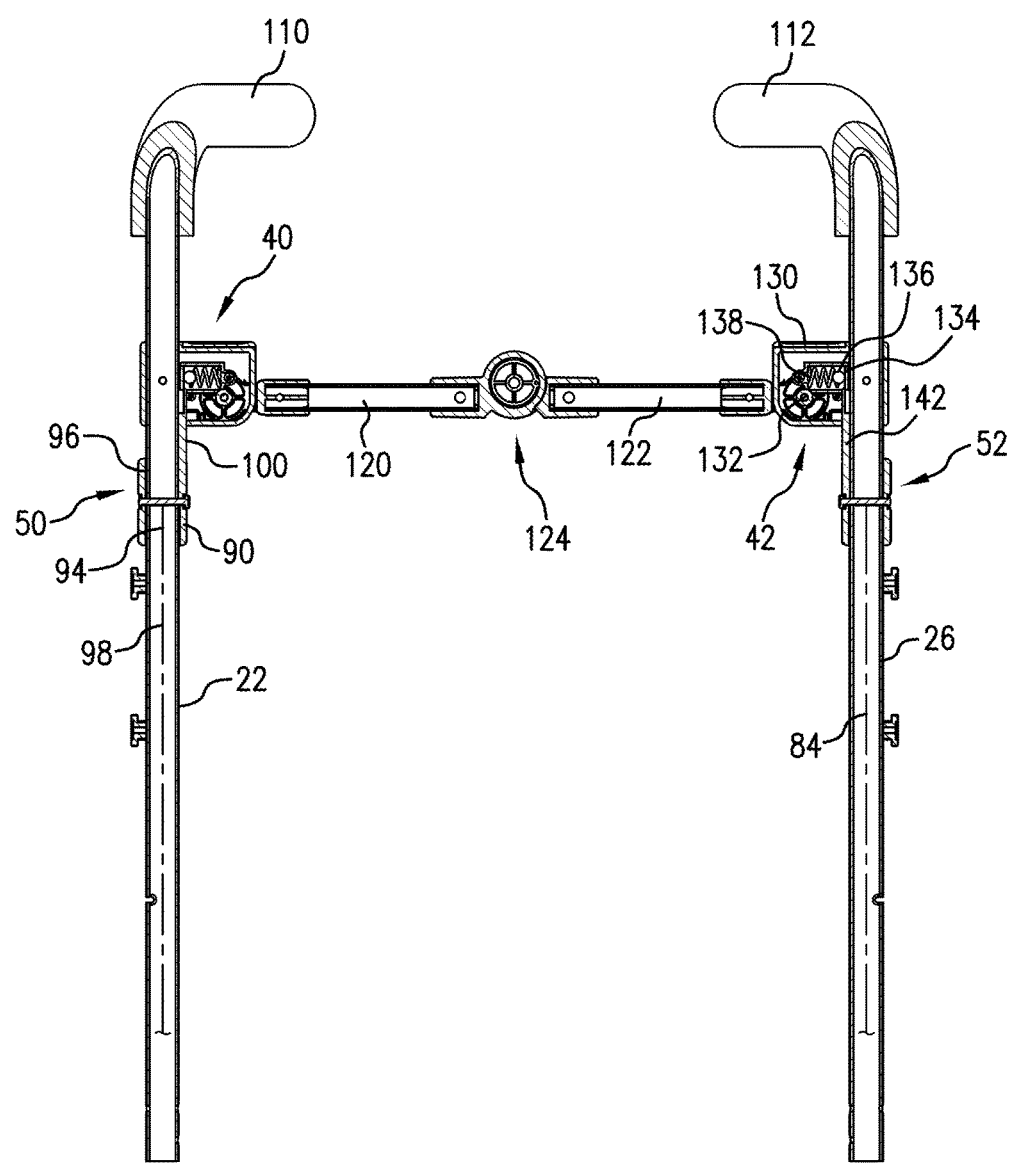
FIG. 4 is a cross-sectional view taken along line 4-4 in FIG. 1.

The stroller 10 also includes a lateral lock mechanism capable of a locked operating state and an unlocked operating state. With reference to FIG. 4, the illustrated stroller includes a right lateral lock mechanism 40 and a left lateral lock mechanism 42. Each lateral lock mechanism 40, 42 precludes lateral movement of the right side frame members 22, 24 toward the left side frame members 26, 28 when the lateral lock mechanism is in the locked operating state. When each lateral lock mechanism 40, 42 is in the unlocked operating state, the lateral lock mechanisms allow lateral movement of the right side frame members 22, 24 toward the left side frame members 26, 28.

The stroller 10 also includes a trigger mechanism on the stroller frame 20. A right trigger mechanism 50 and a left trigger mechanism 52 are provided in the illustrated embodiment. Actuation of the right trigger mechanism 50 moves the right folding lock mechanism from the locked state to the unlocked state and moves the right lateral lock mechanism 40 from the locked operating state to the unlocked operating state. Similarly, actuation of the left trigger mechanism 52 moves the left folding lock mechanism 32 from the locked state to the unlocked state and moves the left lateral lock mechanism 42 from the locked operating state to the unlocked operating state.

With reference back to FIG. 1, the stroller frame 20 includes the right upper side frame member 22 pivotally connected with the right lower side frame member 24 through a right folding hinge mechanism 60, and the left upper side frame member 26 pivotally connected with the left lower side frame member 28 through a left folding hinge mechanism 62. The left folding lock mechanism 32 (FIG. 3) and the left folding hinge mechanism 62 will be described in particularity with the understanding that the right folding lock mechanism and the right folding hinge mechanism 60 include the same components and operate in the same manner.

An inner hub 64 includes an upper extension 66 for connecting with the left upper side frame member 26 (FIG. 1). An outer hub 68 includes a lower extension 72 for connecting with the left lower side frame member 28. With respect to FIG. 3, at least one of the hubs 64, 68, e.g., the outer hub 68 in the illustrated embodiment, includes a lower notch 74 and an upper notch 76, which is angularly spaced 180° from the lower notch 74. A latch 78 is positioned within the hubs 64, 68. The latch 78 includes an extension 82, and the latch 78 is biased radially outwardly from the first pivot axis 30 by a spring or similar mechanism, which is not shown. When the stroller frame 20 is in the deployed position, the extension 82 is received in the lower notch 74 and the left folding lock mechanism 32 is in a first locked state. When the stroller frame 20 is in the collapsed position, the inner hub 64 rotates with respect to the outer hub 68 about the first pivot axis 30 until the extension 82 is received in the upper notch 76. With the extension 82 received in the upper notch 76, the left folding lock mechanism 32 is in a second locked state.

A cable 84 connects with the left trigger mechanism 52 (FIG. 1). The left trigger mechanism 52 includes a left trigger 86 movable between a first location, which is shown in FIG. 1, to a second location when an operator pulls the left trigger 86 upwardly. Pulling the left trigger 86 upwardly pulls on the cable 84, which overcomes the biasing force of the spring to move the extension 82 out of either of the notches 74, 76 to allow for pivotal movement of the left upper side frame member 26 with respect to the left lower side frame member 28.

The stroller 10 includes two trigger mechanisms: the right trigger mechanism 50 and the left trigger mechanism 52. The right trigger mechanism 50 will be described in detail with the understanding that the left trigger mechanism 52 includes the same components and operates in the same manner. The right trigger mechanism 50 includes a sleeve 90 that fits around and receives the right upper side frame member 22. The sleeve 90 moves with respect to the right upper side frame member 22 when an operator pulls a right trigger 92, which is formed with sleeve 90 in the illustrated embodiment. With reference to FIG. 4, a fastener 94 extends through the sleeve 90 and the right upper side frame member 22 to attach the sleeve 90 with the right upper side frame member 22. The right upper side frame member 22 includes aligned elongated slots 96 through which the fastener 94 extends which allows for movement of the sleeve 90 with respect to the right upper side frame member 22. A cable 100, which is similar to the cable 84, connects with the fastener 94 such that movement of the sleeve 90 results in movement of the cable 100. The cable 100 is operatively connected with the right folding lock mechanism in the same way that the cable 84 is connected with the left folding lock mechanism 32.

An extension 100 is formed with the sleeve 90 and extends upwardly from the sleeve 90 toward the right lateral lock mechanism 40. The extension 100 cooperates with the right lateral lock mechanism 40 so as to move the right lateral lock mechanism 40 between the locked operating state and the unlocked operating state. In the illustrated embodiment, the extension 100 is provided on an inner side of the right upper side frame member 22.

The trigger 92 is a closed ring surrounding an opening 102 that can receive an operator's finger. By providing a closed ring, an operator's finger can be maintain contact with the trigger 92 as the right upper side frame member 22 pivots with respect to the right lower side frame member 24 between the deployed position and the collapsed position, and vice versa. The right trigger mechanism 50 is positioned nearer to a right handle 110, which is connected with the right upper side frame member 22, as compared to the first pivot axis 30. Similarly, the left trigger mechanism 52 is positioned nearer to a left handle 112, which is connected with the left upper side frame member 26, as compared to the first pivot axis 30. This provides a convenient location for the trigger mechanisms 50, 52 for when an operator wants to collapse the stroller 10.

The stroller frame 20 also includes a right lateral brace 120 pivotally connected with a left lateral brace 122 through a lateral hinge mechanism 124. The lateral lock mechanisms 40, 42 preclude pivotal movement of the right lateral brace 120 toward the left lateral brace 122 when in the locked operating state, and allow pivotal movement of the right lateral brace 120 toward the left lateral brace 122 when in the unlocked operating state. The right lateral brace 120 is pivotally connected with the right lateral lock mechanism 40. The left lateral brace 122 is pivotally connected with the left lateral lock mechanism 42.

Figure 5:
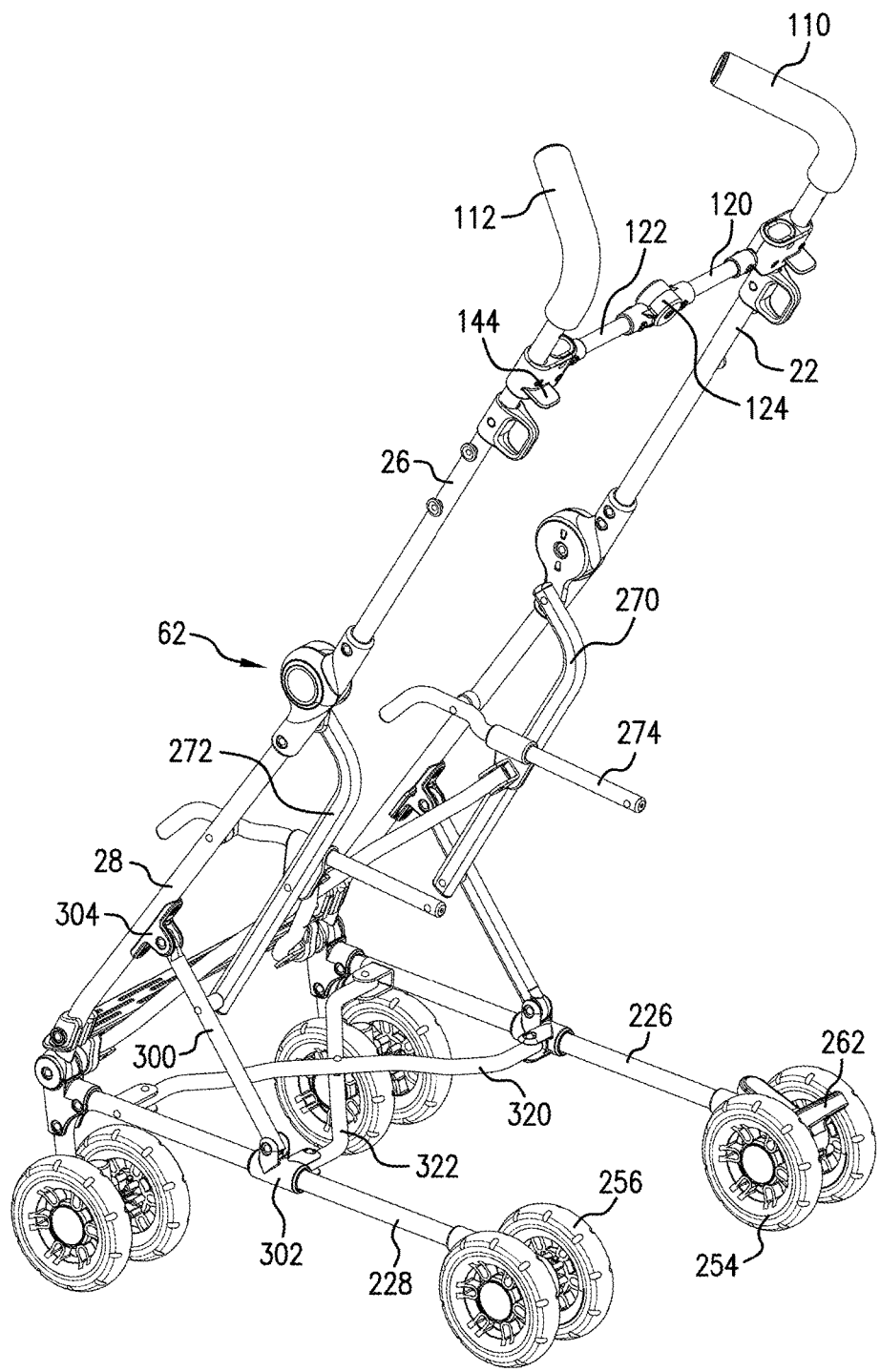
FIG. 5 is a rear perspective view of the stroller frame in the deployed position.

The left lateral lock mechanism 42 and how it cooperates with the left lateral brace 122 will be described in particularity with the understanding that the right lateral lock mechanism 40 and the right lateral brace 120 operate in a similar manner. The left lateral lock mechanism 42 includes a lateral lock mechanism housing 130. The lateral lock mechanism housing 130 connects with the left upper side frame member 26 above the left trigger mechanism 52. Unlike the left trigger 86, the lateral lock mechanism housing 130 is fixed to the left upper side frame member 26 such that movement of the left upper side frame member 26 results in the same movement of the lateral lock mechanism housing 130. The left lateral brace 122 pivots with respect to the lateral lock mechanism housing 130 about a left lateral brace pivot axis 132 (FIG. 4). A detent landing 134 is provided in the lateral lock mechanism housing 130. A ball detent 136, which is biased outwardly by a spring 138, is provided at an end of the left lateral brace 122 that is received in the lateral lock mechanism housing 130. The ball detent 136 is received in the detent landing 134 when the left lateral lock mechanism is in the locked operating state. When an operator pulls up on left trigger 86, an extension 142 (similar to the extension 100 on the right trigger mechanism 50) contacts the ball detent 136 and overcomes the biasing force of the spring 138 to move the ball detent 136 away from the detent landing 134, which places the left lateral lock mechanism 42 in the unlocked operating state. A platform 144 (FIG. 5) extends rearwardly from the lateral lock mechanism housing 130, and an operator can place her thumb on the platform when pulling the left trigger 86. With the left lateral lock mechanism 42 in the unlocked operating state, the left lateral brace 122 can pivot about the left lateral brace pivot axis 132 with respect to the lateral lock mechanism housing 130. The left lateral brace 122 can also then pivot with respect to the right lateral brace 120, which allows the right side frame members 22, 24 to be brought towards the left side frame members 26, 28.

The stroller frame 20 also includes a lower right support 226 and a lower left support 228. The lower side frame members 24, 28 can pivot with respect to the lower supports 226, 228 about a lower leg collapse axis 230. The right lower side frame member 24 connects with the lower right support 226 through a right lower hinge mechanism 232. The left lower side frame member 28 and the lower left support 228 connect through a left hinge mechanism 234.

A right swivel mechanism 236 connects a front right wheel assembly 238 to the right lower hinge mechanism 232. Similarly, a left swivel mechanism 244 connects a front left wheel assembly 246 to the left lower hinge mechanism 234. Each wheel assembly 238, 246 includes two wheels, however, a single wheel could be provided. A foot rest 252 attaches to each lower side frame member 24, 28 above the right lower hinge mechanism 232 and the left lower hinge mechanism 234.

A rear right wheel assembly 254 connects with the lower right support 226 at an end opposite the right lower hinge mechanism 232. A rear left wheel assembly 256 connects with the lower left support 228 at an end opposite the left lower hinge mechanism 234. A right brake pedal 262 can be provided on rear right wheel assembly 254 to actuate a brake mechanism (not shown in detail), which can be conventional, to prevent the rear right wheel assembly 254, and thus the stroller 10, from rolling.

The stroller frame 20 also includes a right rail member 270 that extends downwardly from the right folding hinge mechanism 60 and a left rail member 272 that extends downwardly from the left folding hinge mechanism 62. A right seat frame member 274 connects with the right rail member 270 through a right seat slide bracket 276. A left seat frame member 278 connects with the left rail member 272 through a left seat slide bracket 282. The right seat frame member 274 slides within the right seat slide bracket 276, and the left seat frame member 278 slides within the left seat slide bracket 282 when the stroller frame is moved between the deployed position and the collapsed position.

The stroller frame 20 also includes a right strut 290 connected with the lower right support 226 through a right strut slide bracket 292 and connected with the right lower side frame member 24 through a right strut bracket 294. The right strut 290 pivots with respect to the right lower side frame member 24 when the rear wheels 254, 256 are brought toward the first pivot axis 30. The right strut slide bracket 292 connects with the lower right support 226 such that the lower right support 226 can slide within the right strut slide bracket 292 when the stroller frame is moved between the deployed position and the collapsed position. The stroller frame also includes a left strut 300, a left strut slide bracket 302, and a left strut bracket 304. The left strut 300, the left strut slide bracket 302, and the left strut bracket 304 operate in the same manner as the respective right strut 290, right strut slide bracket 292, and the right strut bracket 294. The stroller frame also includes upper cross frame members 310, 312 and lower cross frame members 320, 322 that operate in manners similar to those in known umbrella strollers.

A method for moving the stroller between the deployed position and the collapsed position involves, with the stroller in the deployed position as shown in FIG. 1, moving a trigger, either trigger 86 or 92, provided on the stroller frame 20 from a first location (shown in FIG. 1) to a second location, which changes a folding lock mechanism, such as the left folding lock mechanism 32, from a locked state to an unlocked state and changes a lateral lock mechanism, such as the right lateral lock mechanism 40 or the left lateral lock mechanism 42, from a locked operating state to an unlocked operating state. With the folding lock mechanism, such as the folding lock mechanism 32, in the unlocked state, the upper side frame members 22, 26 are pivoted toward the lower side frame members 24, 28. With the lateral lock mechanisms 40, 42 in the unlocked operating state, the right side frame members 22, 24 can be moved toward the left side frame members 26, 28 so as to move the stroller frame from the deployed position (shown in FIG. 1) to the collapsed position (shown in FIG. 2). With reference to FIG. 2, with the stroller in the collapsed position, the triggers 86, 92 can be moved from the first location to the second location. The upper side frame members 22, 26 can then be pivoted away from the lower side frame members 24, 28. Also, the right side frame members 22, 24 can be moved away from the left side frame members 26, 28.

A collapsible stroller and a method for collapsing the stroller have been described above with particularity. Directional terms, such as, top, bottom, left, right, up, down, over, above, below, beneath, rear, and front are used with respect to the accompanying drawings. Such directional terms should not be construed to limit the scope of the invention in any manner. Modifications and alterations will occur to those upon reading and understanding the preceding detailed description. The invention, however, is not limited to only the embodiments described above. Instead, the invention is broadly defined by the appended claims and the equivalents thereof. Also various presently unforeseen or unanticipated alternatives, modifications, variations or improvements therein may be subsequently made by those skilled in the art which are also intended to be encompassed by the following claims.

The invention claimed is:

1. A collapsible stroller comprising:
   a stroller frame movable between a deployed position and a collapsed position, the stroller frame including a right upper side frame member pivotally connected with a right lower side frame member and a left upper side frame member pivotally connected with a left lower side frame member;
   a folding lock mechanism capable of a locked state and an unlocked state, wherein in the locked state the folding lock mechanism precludes the upper side frame members from pivoting toward the lower side frame members, and in the unlocked state allows the upper side frame members to pivot towards the lower side frame members;
   a lateral lock mechanism capable of a locked operating state and an unlocked operating state, wherein in the locked operating state the lateral lock mechanism precludes lateral movement of the right side frame members toward the left side frame members, and in the unlocked operating state the lateral lock mechanism allows lateral movement of the right side frame members toward the left side frame members; and
   a trigger mechanism on the stroller frame, wherein actuation of the trigger mechanism moves the folding lock mechanism from the locked state to the unlocked state and moves the lateral lock mechanism from the locked operating state to the unlocked operating state,
   wherein the lateral lock mechanism is located above the trigger mechanism and the folding lock mechanism is located below the trigger mechanism when the stroller frame is in the deployed position.

2. The stroller of claim 1, wherein the trigger mechanism includes a trigger movable between a first location and a second location, wherein movement of the trigger from the first location to the second location moves the folding lock mechanism from the locked state to the unlocked state and moves the lateral lock mechanism from the locked operating state to the unlocked operating state.

3. The stroller of claim 2, wherein the trigger is a closed ring surrounding an opening.

4. The stroller of claim 2, wherein the trigger mechanism includes an extension connected with the trigger such that movement of the trigger results in movement of the extension, wherein the extension engages the lateral lock mechanism to move the lateral lock mechanism from the locked operating state to the unlocked operating state.

5. A collapsible stroller comprising:
   a stroller frame movable between a deployed position and a collapsed position, the stroller frame including a right upper side frame member pivotally connected with a right lower side frame member and a left upper side frame member pivotally connected with a left lower side frame member;
   a folding lock mechanism capable of a locked state and an unlocked state, wherein in the locked state the folding lock mechanism precludes the upper side frame members from pivoting toward the lower side frame members, and in the unlocked state allows the upper side frame members to pivot towards the lower side frame members;
   a lateral lock mechanism capable of a locked operating state and an unlocked operating state, wherein in the locked operating state the lateral lock mechanism precludes lateral movement of the right side frame members toward the left side frame members, and in the unlocked operating state the lateral lock mechanism allows lateral movement of the right side frame members toward the left side frame members;
   a trigger mechanism on the stroller frame, wherein actuation of the trigger mechanism moves the folding lock mechanism from the locked state to the unlocked state and moves the lateral lock mechanism from the locked operating state to the unlocked operating state; and
   a right lateral brace pivotally connected with a left lateral brace, wherein the lateral lock mechanism precludes pivotal movement of the right lateral brace toward the left lateral brace when in the locked operating state, wherein the lateral lock mechanism allows pivotal movement of the right lateral brace toward the left lateral brace when in the unlocked operating state, wherein the lateral lock mechanism is a right lateral lock mechanism, wherein the stroller further includes a left lateral lock mechanism, wherein the right lateral brace is pivotally connected with the right lateral lock mechanism, wherein the left lateral brace is pivotally connected with the left lateral lock mechanism.

6. The stroller of claim 5, wherein the trigger mechanism is a right trigger mechanism, wherein the stroller further includes a left trigger mechanism, wherein the right trigger mechanism cooperates with the right lateral lock mechanism, wherein the left trigger mechanism cooperates with the left lateral lock mechanism.

7. The stroller of claim 6, wherein the folding lock mechanism is a right folding lock mechanism, wherein the stroller further includes a left folding lock mechanism, wherein the right trigger mechanism cooperates with the right folding lock mechanism, wherein the left trigger mechanism cooperates with the left folding lock mechanism.

8. The stroller of claim 1, wherein the stroller frame includes a right handle connected with the right upper side frame member and a right folding hinge mechanism connecting the right upper side frame member with the right lower side frame member, wherein the trigger mechanism is a right trigger mechanism mounted on the right upper side frame member nearer to the right handle as compared to the right folding hinge mechanism.

9. The stroller frame of claim 8, wherein the stroller frame includes a left handle connected with the left upper side frame member and a left folding hinge mechanism connecting the left upper side frame member with the left lower side frame member, the stroller further comprising a left trigger mechanism mounted on the left upper side frame member nearer to the left handle as compared to the left folding hinge mechanism.

10. A collapsible stroller comprising:
    a stroller frame movable between a deployed position and a collapsed position, the stroller frame including a right upper side frame member pivotally connected with a right lower side frame member and a left upper side frame member pivotally connected with a left lower side frame member;
    a folding lock mechanism capable of a locked state and an unlocked state, wherein in the locked state the folding lock mechanism precludes the upper side frame members from pivoting toward the lower side frame members, and in the unlocked state allows the upper side frame members to pivot towards the lower side frame members, wherein the folding lock mechanism is capable of a first locked state, a second locked state and the unlocked state, wherein in the first locked state the folding lock mechanism precludes the upper side frame members from pivoting toward the lower side frame members when the stroller frame is in the deployed position, wherein in the second locked state the folding lock mechanism precludes the upper side frame members from pivoting away from the lower side frame members when the stroller frame is in the collapsed position, and in the unlocked state allows the upper side frame members to pivot with respect to the lower side frame members between the deployed position and the collapsed position, and vice versa;
    a lateral lock mechanism capable of a locked operating state and an unlocked operating state, wherein in the locked operating state the lateral lock mechanism precludes lateral movement of the right side frame members toward the left side frame members, and in the unlocked operating state the lateral lock mechanism allows lateral movement of the right side frame members toward the left side frame members; and
    a trigger mechanism on the stroller frame, wherein actuation of the trigger mechanism moves the folding lock mechanism from the locked state to the unlocked state and moves the lateral lock mechanism from the locked operating state to the unlocked operating state.

11. The stroller frame of claim 10, wherein actuation of the trigger mechanism with the stroller in the deployed position moves the folding lock mechanism from the first locked state to the unlocked state and actuation of the trigger mechanism with the stroller in the collapsed position moves the folding lock mechanism from the second locked state to the unlocked state.

12. A collapsible stroller comprising:
    a stroller frame movable between a deployed position and a collapsed position, the stroller frame including at least one handle, a right upper side frame member pivotally connected with a right lower side frame member via at least one folding hinge mechanism and a left upper side frame member pivotally connected with a left lower side frame member via the at least one folding hinge mechanism;

a folding lock mechanism capable of a locked state and an unlocked state, wherein in the locked state the folding lock mechanism precludes the upper side frame members from pivoting toward the lower side frame members, and in the unlocked state allows the upper side frame members to pivot towards the lower side frame members;

a lateral lock mechanism capable of a locked operating state and an unlocked operating state, wherein in the locked operating state the lateral lock mechanism precludes lateral movement of the right side frame members toward the left side frame members, and in the unlocked operating state the lateral lock mechanism allows lateral movement of the right side frame members toward the left side frame members;

a trigger mechanism mounted on the stroller frame nearer to the at least one handle as compared to the at least one folding hinge mechanism when the stroller frame is in the deployed position, wherein actuation of the trigger mechanism moves the folding lock mechanism from the locked state to the unlocked state and moves the lateral lock mechanism from the locked operating state to the unlocked operating state.

\* \* \* \* \*